US008918597B2

(12) United States Patent
Brox et al.

(10) Patent No.: US 8,918,597 B2
(45) Date of Patent: Dec. 23, 2014

(54) DIGITAL DATA INVERSION FLAG GENERATOR CIRCUIT

(75) Inventors: Martin Brox, Munich (DE); Ronny Schneider, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1380 days.

(21) Appl. No.: 12/201,876

(22) Filed: Aug. 29, 2008

(65) Prior Publication Data

US 2010/0052729 A1    Mar. 4, 2010

(51) Int. Cl.
| | |
|---|---|
| G06F 12/00 | (2006.01) |
| G06F 13/00 | (2006.01) |
| G06F 13/28 | (2006.01) |
| H03M 7/00 | (2006.01) |
| H03M 5/00 | (2006.01) |
| H03K 19/003 | (2006.01) |
| H03K 19/23 | (2006.01) |
| G11C 7/10 | (2006.01) |
| G11C 7/06 | (2006.01) |
| G06F 13/42 | (2006.01) |

(52) U.S. Cl.
CPC ................... *G06F 13/4239* (2013.01)
USPC ............... 711/154; 341/50; 341/55; 341/58; 326/11; 326/35; 711/105; 711/104; 711/111; 365/189.05; 365/189.07; 710/100

(58) Field of Classification Search
None
See application file for complete search history.

(56) References Cited

U.S. PATENT DOCUMENTS

| | | | | |
|---|---|---|---|---|
| 6,633,951 | B2 * | 10/2003 | Cohen | 711/105 |
| 6,918,002 | B2 * | 7/2005 | Kumaki et al. | 711/104 |
| 7,397,395 | B2 * | 7/2008 | Tschanz et al. | 341/51 |
| 7,506,146 | B2 * | 3/2009 | Joshi | 713/1 |
| 2007/0242508 | A1 * | 10/2007 | Bae | 365/184 |
| 2008/0151656 | A1 * | 6/2008 | Nakai | 365/189.16 |

OTHER PUBLICATIONS

Nakamura et al., "A 50% Noise Reduction Interface Using Low-Weight Coding", 1996 Symposium on VLSI Circuits Digest of Technical Papers, 1996 IEEE, pp. 144-145.
Ihm et al., "An 80nm 4Gb/s/pin 32b 512Mb GDDR4 Graphics DRAM with Low-Power and Low-Noise Data-Bus Inversion", ISSC 2007 / Session 27 / DRAM and eRAM 27.4, 2007 IEEE International Solid-State Circuits Conference, Digest of Technical Papers, 2 pages.
Article by Qimonda, "Qimonda GDDR5—White Paper", Aug. 2007, 10 pages.

* cited by examiner

*Primary Examiner* — Yaima Rigol
*Assistant Examiner* — Marwan Ayash
(74) *Attorney, Agent, or Firm* — John S. Economou

(57) ABSTRACT

An integrated circuit includes an array of memory cells and a digital flag generator circuit configured to generate a data inversion flag based on whether a number of logical zero bits contained in a data word to be transmitted from the memory cells is greater than a threshold number. The digital flag generator circuit includes a first digital stage including a first plurality of binary logic circuits. Each of the binary logic circuits is configured to receive a subset of the data word.

18 Claims, 4 Drawing Sheets

DIGITAL DATA INVERSION FLAG GENERATOR CIRCUIT

BACKGROUND

Typically, an electronic system includes a number of integrated circuit chips that communicate with one another to perform system applications. Often, the electronic system includes a controller, such as a micro-processor, and one or more memory chips, such as random access memory (RAM) chips. The controller communicates with the memory to store data and to read the stored data.

The RAM chips can be any suitable type of RAM, such as dynamic RAM (DRAM) including single data rate synchronous DRAM (SDR-SDRAM), double data rate SDRAM (DDR-SDRAM), graphics DDR-SDRAM (GDDR-SDRAM), low power SDR-SDRAM (LPSDR-SDRAM), and low power DDR-SDRAM (LPDDR-SDRAM). Also, the RAM chips can be any suitable generation of memory including fourth generation DDR-SDRAM (DDR4-SDRAM), fifth generation GDDR-SDRAM (GDDR5-SDRAM), and higher generations of memory. Usually, each new generation of memory operates at an increased clock speed and/or an increased data rate from the previous generation.

Some memories use data bit inversion (DBI), which is also referred to as data bus inversion, to reduce the number of zeros that are transmitted and to improve signal integrity. For example, an 8-bit data byte may be inverted if more than fifty percent of the data bits within the byte are zeros. A DBI flag is typically generated and transmitted with the data to indicate whether data bytes are inverted or not. For memories that have high level termination, using DBI to reduce the number of signal lines driving a low level (e.g., zero) results in reduced power dissipation in the termination resistors and output drivers. Also, DBI improves the signal quality by reducing the supply noise induced jitter on the data lines.

SUMMARY

One embodiment provides an integrated circuit including an array of memory cells and a digital flag generator circuit configured to generate a data inversion flag based on whether a number of logical zero bits contained in a data word to be transmitted from the memory cells is greater than a threshold number. The digital flag generator circuit includes a first digital stage including a first plurality of binary logic circuits. Each of the binary logic circuits is configured to receive a subset of the data word.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
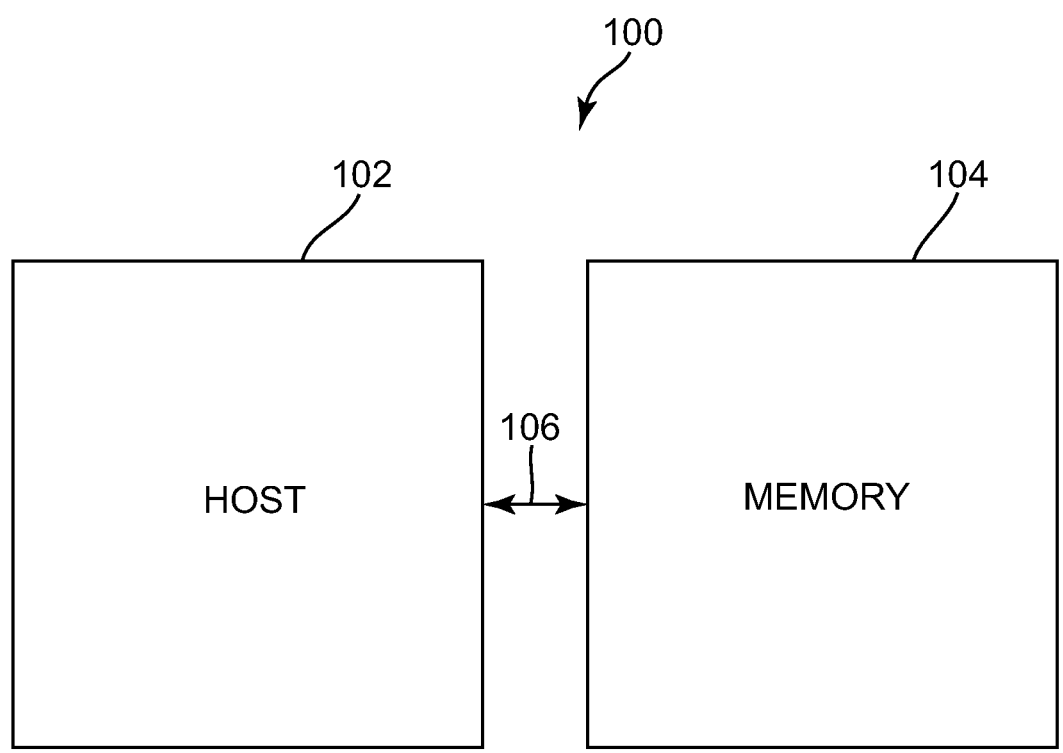
FIG. 1 is a block diagram illustrating a system with a memory according to one embodiment.

FIG. 1 is a block diagram illustrating a system 100 according to one embodiment. System 100 includes a host 102 and a memory 104. Host 102 is communicatively coupled to memory 104 through communication link 106. Host 102 includes a computer (e.g., desktop, laptop, handheld), portable electronic device (e.g., cellular phone, personal digital assistant (PDA), MP3 player, video player, digital camera), or any other suitable device that uses memory. Memory 104 provides data storage for host 102. In one embodiment, memory 104 is an integrated circuit or part of an integrated circuit. In one embodiment, memory device 100 is a dynamic random access memory (DRAM) device.

Figure 2:
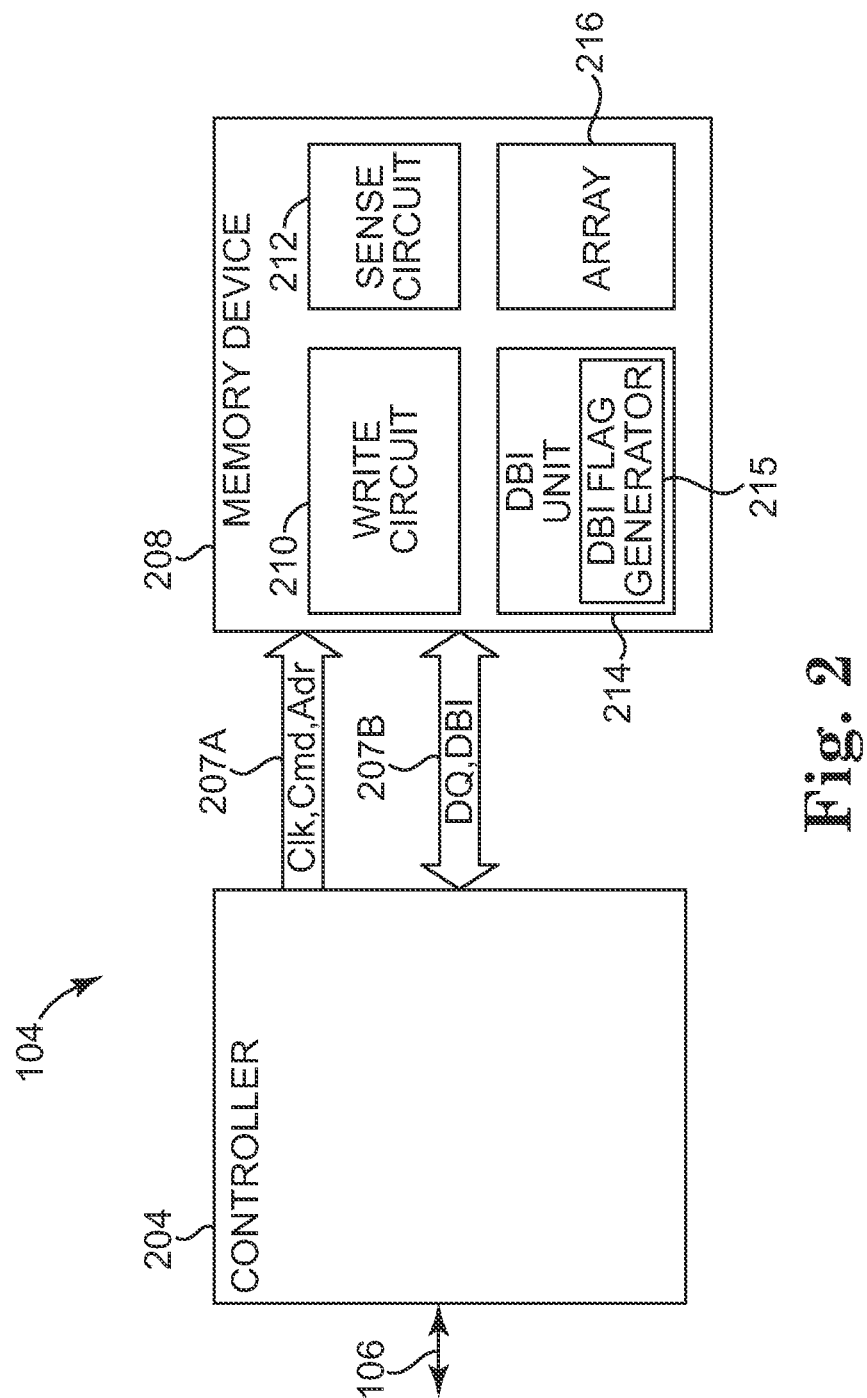
FIG. 2 is a block diagram illustrating a memory according to one embodiment.

FIG. 2 is a diagram illustrating a memory 104 according to one embodiment. Memory 104 includes controller 204 and memory device 208. In one embodiment, controller 204 and memory device 208 are separate integrated circuit chips, or located in separate integrated chips. Memory device 208 includes write circuit 210, sense circuit 212, data bit inversion (DBI) unit 214, and memory cell array 216. DBI unit 214 includes a digital DBI flag generator circuit (also referred to as a digital DBI decoder) 215. In one embodiment, memory array 216 includes a plurality of memory cells, a plurality of word lines, and a plurality of bit lines, with each memory cell electrically coupled to a word line and a bit line.

As used herein, the term "electrically coupled" is not meant to mean that the elements must be directly coupled together and intervening elements may be provided between the "electrically coupled" elements.

Controller 204 is communicatively coupled to memory device 208 through communication links 207A-207B (collectively referred to as communication links 207). In one embodiment, communication links 207A-207B each include a plurality of signal paths. Controller 204 is configured to send clock (Clk), command (Cmd), and address (Adr) signals to memory device 208 through communication link 207A. Controller 204 is configured to write or read data (DQ) to or from memory device 208 and receive DBI flags from memory device 208 through communication link 207B.

Controller 204 includes a microprocessor, microcontroller, or other suitable logic circuitry for controlling the operation of memory device 208. Controller 204 communicates with host 102 via communication link 106 to receive data from host 102 to be stored in memory device 208 and to send data stored in memory device 208 to host 102. Controller 204 controls read and write operations of memory device 208 including the application of control and data signals to memory array 216 through write circuit 210, and sense circuit 212.

For a write operation according to one embodiment, memory device 208 receives data to write to memory array 216 from controller 204 through communication link 207B. Write circuit 210 writes the received data to memory array 216. For a read operation according to one embodiment, sense circuit 212 reads data from the memory array 216. Memory device 208 transmits the data read from memory array 216 to controller 204 through communication link 207B. In one embodiment, memory device 208 inverts 8-bit data bytes to be transmitted to controller 204 if the data byte includes five or more logical zero bits (i.e., bits having a logic value of zero). The inverted data byte is then transmitted to controller 204 instead of the original non-inverted data byte. DBI flags are also generated and transmitted to controller 204 on communication link 207B to indicate whether the corresponding data bytes are inverted or not.

DBI unit 214 receives data words to be transmitted to controller 204 from memory array 216. In one embodiment, DBI flag generator 215 is configured to generate a DBI flag based on whether a number of logical zero bits contained in a data word to be transmitted from the memory array 216 is greater than a threshold number (e.g., four). In one embodiment, DBI flag generator 215 determines whether the number of logical zero data bits in a received data word exceeds half the data word length (i.e., whether the number of logical zero data bits contained in the data word is greater than the number of logical one data bits contained in the data word). In one embodiment, the data word length is eight bits, and DBI flag generator 215 determines whether the number of zero data bits in a received 8-bit data word exceeds four (i.e., whether the number of logical zero data bits is at least five). If the number of logical zero data bits exceeds half the word length, DBI unit 214 inverts the data word, and a DBI flag with a logic high state is transmitted with the data word. If the number of zero data bits does not exceed half the word length, DBI unit 214 does not invert the data word, and a DBI flag with a logic low state is transmitted with the data word. In another embodiment, the DBI flag transmitted with the data word has a logic high state to indicate the data word is not inverted, and has a logic low state to indicate the data word is inverted.

For example, if DBI unit 214 receives the data word "01001100" from array 216, DBI flag generator 215 determines that the data word includes at least five zero data bits and generates a corresponding DBI flag (e.g., a DBI flag with a logic high state). Since five is greater than four (i.e., the word length, eight, divided by two), DBI unit 214 inverts the data word in response to the determination by DBI flag generator 215 to provide the inverted data word "10110011". The inverted data word and its corresponding DBI flag that indicates the inversion are transmitted from memory device 208 to controller 204 via communication link 207B.

If DBI unit 214 receives the data word "10110011", DBI flag generator 215 determines that the data word does not include at least five zero data bits and generates a corresponding DBI flag (e.g., a DBI flag with a logic low state). In response to the determination by DBI flag generator 215, DBI unit 214 does not invert the data word. The non-inverted data word and its corresponding DBI flag that indicates the non-inversion are transmitted from memory device 208 to controller 204 via communication link 207B.

Figure 3:
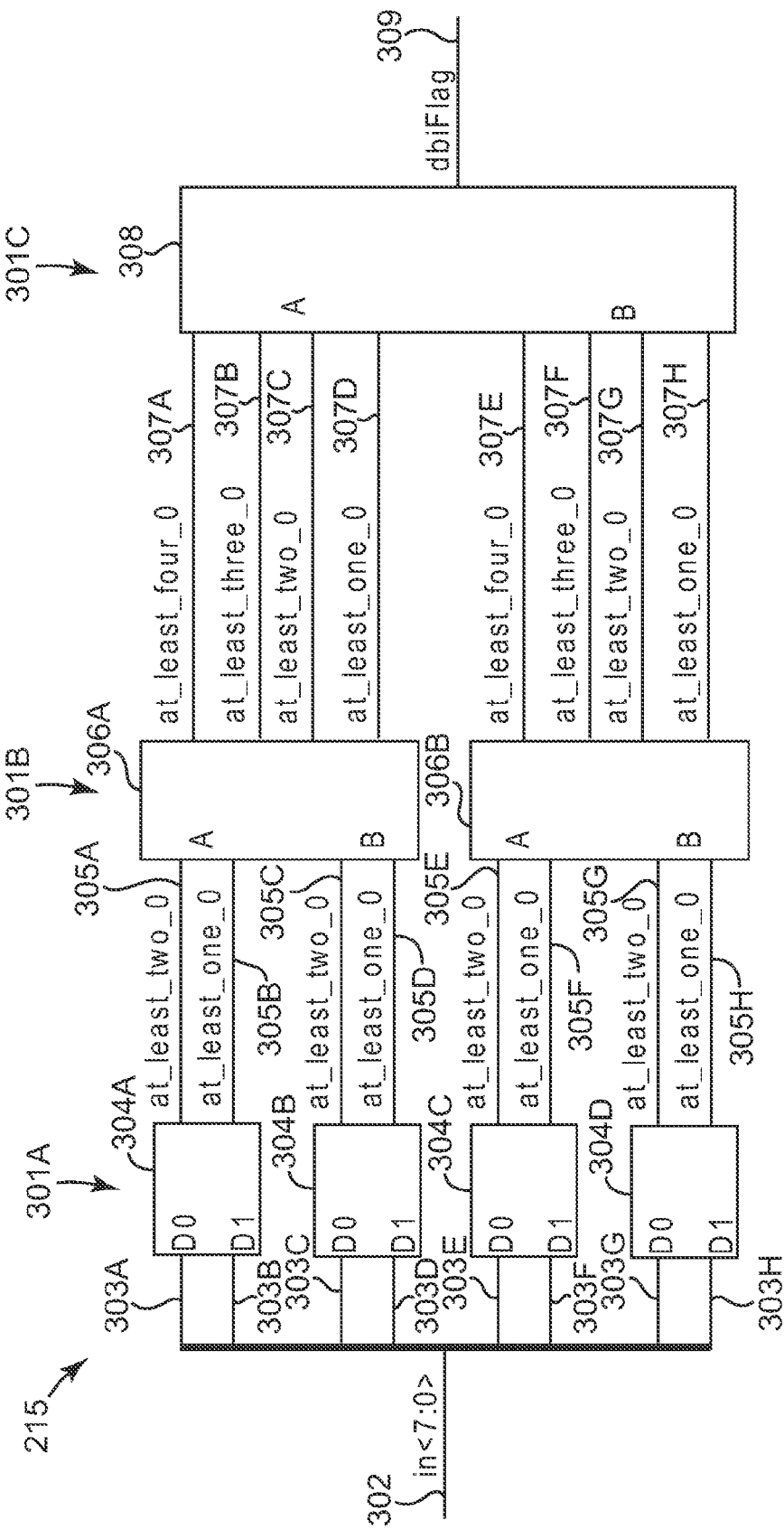
FIG. 3 is a block diagram illustrating a digital DBI flag generator circuit according to one embodiment.

FIG. 3 is a block diagram illustrating a digital DBI flag generator circuit 215 according to one embodiment. Digital DBI flag generator unit 215 includes an input 302, three digital stages 301A-301C, and output 309. Digital stage 301A includes binary digital logic circuits 304A-304D. Digital stage 301B includes binary digital logic circuits 306A and 306B. Digital stage 301C includes binary digital logic circuit 308. In the illustrated embodiment, circuit 215 performs DBI decoding and DBI flag generation in a completely digital manner. Circuit 215 breaks the DBI decoding of eight bits down into a three step hierarchical approach, with each digital stage 301A-301C performing one step in the hierarchy. In one embodiment, digital stage 301B processes logical signals output from the binary logic circuits in digital stage 301A, and digital stage 301C processes logical signals output from the binary logic circuits in digital stage 301B, to determine whether a number of logical zero bits contained in a received data word is greater than a threshold number. In one embodiment, circuit 215 is configured to generate a DBI flag based on the determination of whether the number of logical zero bits contained in the data word is greater than the threshold number.

In one embodiment, circuit 215 receives 8-bit data words (in<7:0>) from memory array 216 through input 302. For each received 8-bit data word, a first set of two bits of the word are provided to inputs D0 and D1 of circuit 304A via respective signal paths 303A and 303B; a second set of two bits of the word are provided to inputs D0 and D1 of circuit 304B via respective signal paths 303C and 303D; a third set of two bits of the word are provided to inputs D0 and D1 of circuit 304C via respective signal paths 303E and 303F; and a fourth set of two bits of the word are provided to inputs D0 and D1 of circuit 304D via respective signal paths 303G and 303H.

Circuits 304A-304D perform the first step in the three step hierarchical DBI decoding. Circuits 304A-304D each generate two binary output signals indicative of the number of logical zero bits in the subset of bits (i.e., the set of two bits) that the circuit receives. Within each of the four sets of two bits provided to circuits 304A-304D, there can be no zeros, one zero, or two zeros. The number of zeros within the two bits received on inputs D0 and D1 is coded by each of the circuits 304A-304D into two binary output signals, and the logic equation for the coding according to one embodiment is giving in the following Equations I and II:

$$\text{at\_least\_two\_0} = \text{not}(D0) \text{ and } \text{not}(D1) \qquad \text{Equation I}$$

$$\text{at\_least\_one\_0} = \text{not}(D0 \text{ and } D1) \qquad \text{Equation II}$$

Equation I corresponds to signal paths 305A, 305C, 305E, and 305G, and Equation II corresponds to signal paths 305B, 305D, 305F, and 305H. Circuit 304A is electrically coupled to a set of "A" inputs of circuit 306A via the signal paths 305A and 305B. If the set of two bits received by circuit 304A does not include any zero bits, circuit 304A outputs a logic low signal on signal paths 305A and 305B. When circuit 304A determines based on Equation II that its received set of two bits includes at least one zero bit, circuit 304A outputs a logic high signal on signal path 305B. When circuit 304A determines based on Equation I that its received set of two bits includes at least two zero bits (which also indicates that its received set of two bits includes at least one zero bit), circuit 304A outputs a logic high signal on signal paths 305A and 305B. Thus, in one embodiment, if the received set of two bits includes no zero bits, signal paths 305A and 305B will both be low; if the received set of two bits includes one zero bit, signal path 305A will be low and signal path 305B will be high; and if the received set of two bits includes two zero bits, signal paths 305A and 305B will both be high.

In one embodiment, circuits 304B-304D operate in the same manner as circuit 304A. Circuit 304B is electrically coupled to a set of "B" inputs of circuit 306A via signal paths 305C and 305D. If the set of two bits received by circuit 304B does not include any zero bits, circuit 304B outputs a logic low signal on signal paths 305C and 305D. When circuit 304B determines based on Equation II that its received set of two bits includes at least one zero bit, circuit 304B outputs a logic high signal on signal path 305D. When circuit 304B determines based on Equation I that its received set of two bits includes at least two zero bits (which also indicates that its received set of two bits includes at least one zero bit), circuit 304B outputs a logic high signal on signal paths 305C and 305D. Thus, in one embodiment, if the received set of two bits includes no zero bits, signal paths 305C and 305D will both be low; if the received set of two bits includes one zero bit, signal path 305C will be low and signal path 305D will be high; and if the received set of two bits includes two zero bits, signal paths 305C and 305D will both be high.

Circuit 304C is electrically coupled to a set of "A" inputs of circuit 306B via signal paths 305E and 305F. If the set of two bits received by circuit 304C does not include any zero bits, circuit 304C outputs a logic low signal on signal paths 305E and 305F. When circuit 304C determines based on Equation II that its received set of two bits includes at least one zero bit, circuit 304C outputs a logic high signal on signal path 305F. When circuit 304C determines based on Equation I that its received set of two bits includes at least two zero bits (which also indicates that its received set of two bits includes at least one zero bit), circuit 304C outputs a logic high signal on signal paths 305E and 305F. Thus, in one embodiment, if the received set of two bits includes no zero bits, signal paths 305E and 305F will both be low; if the received set of two bits includes one zero bit, signal path 305E will be low and signal path 305F will be high; and if the received set of two bits includes two zero bits, signal paths 305E and 305F will both be high.

Circuit 304D is electrically coupled to a set of "B" inputs of circuit 306B via signal paths 305G and 305H. If the set of two bits received by circuit 304D does not include any zero bits, circuit 304D outputs a logic low signal on signal paths 305G and 305H. When circuit 304D determines based on Equation II that its received set of two bits includes at least one zero bit, circuit 304D outputs a logic high signal on signal path 305H. When circuit 304D determines based on Equation I that its received set of two bits includes at least two zero bits (which also indicates that its received set of two bits includes at least one zero bit), circuit 304D outputs a logic high signal on signal paths 305G and 305H. Thus, in one embodiment, if the received set of two bits includes no zero bits, signal paths 305G and 305H will both be low; if the received set of two bits includes one zero bit, signal path 305G will be low and signal path 305H will be high; and if the received set of two bits includes two zero bits, signal paths 305G and 305H will both be high.

Circuits 306A and 306B perform the second step in the three step hierarchical DBI decoding. In one embodiment, circuits 306A and 306B each generate four logic signals indicative of the number of logical zero bits contained in four bits of a received data word based on the logic signals generated by circuits 304A-304D. The number of zeros within the four bits evaluated by each of circuits 306A and 306B based on the signals received on inputs A and B is coded by each of the circuits 306A and 306B into four output signals, and the logic equation for the coding is giving in the following Equations III through VI:

$$\text{at\_least\_four\_0} = (\text{at\_least\_two\_0})_A \text{ and } (\text{at\_least\_two\_0})_B \quad \text{Equation III}$$

$$\text{at\_least\_three\_0} = \{(\text{at\_least\_two\_0})_A \text{ and } (\text{at\_least\_one\_0})_B\} \text{ or } \{(\text{at\_least\_one\_0})_A \text{ and } (\text{at\_least\_Two\_0})_B\} \quad \text{Equation IV}$$

$$\text{at\_least\_two\_0} = \{(\text{at\_least\_two\_0})_A\} \text{ or } \{(\text{at\_least\_two\_0})_B\} \text{ or } \{\{\text{at\_least\_one\_0}\}_A \text{ and } \{\text{at\_least\_one\_0}\}_B\} \quad \text{Equation V}$$

$$\text{at\_least\_one\_0} = \{\text{at\_least\_one\_0}\}_A \text{ or } \{\text{at\_least\_one\_0}\}_B \quad \text{Equation VI}$$

Equation III corresponds to signal paths 307A and 307E. Equation IV corresponds to signal paths 307B and 307F. Equation V corresponds to signal paths 307C and 307G. Equation VI corresponds to signal paths 307D and 307H. Circuit 306A is electrically coupled to a set of "A" inputs of circuit 308 via signal paths 307A-307D.

If the two sets of two bits received by circuits 304A and 304B do not include any zero bits, circuit 306A outputs a logic low signal on signal paths 307A-307D. When circuit 306A determines, based on Equation VI and the logic signals received on signal paths 305A-305D, that the two sets of two bits received by circuits 304A and 304B include at least one zero bit, circuit 306A outputs a logic high signal on signal path 307D. When circuit 306A determines, based on Equation V and the logic signals received on signal paths 305A-305D, that the two sets of two bits received by circuits 304A and 304B include at least two zero bits (which also indicates that the two sets of two bits include at least one zero bit), circuit 306A outputs a logic high signal on signal paths 307C and 307D. When circuit 306A determines, based on Equation IV and the logic signals received on signal paths 305A-305D, that the two sets of two bits received by circuits 304A and 304B include at least three zero bits (which also indicates that the two sets of two bits include at least one zero bit, and at least two zero bits), circuit 306A outputs a logic high signal on signal paths 307B, 307C, and 307D. When circuit 306A determines, based on Equation III and the logic signals received on signal paths 305A-305D, that the two sets of two bits received by circuits 304A and 304B include at least four zero bits (which also indicates that the two sets of two bits include at least one zero bit, and at least two zero bits, and at least three zero bits), circuit 306A outputs a logic high signal on signal paths 307A, 307B, 307C, and 307D.

Thus, in one embodiment, if the two sets of two bits received by circuit 304A and 304B include no zero bits, signal paths 307A-307D will all be low; if the two received sets of two bits include one zero bit, signal paths 307A-307C will be low and signal path 307D will be high; if the two received sets of two bits include two zero bits, signal paths 307A and 307B will both be low and signal paths 307C and 307D will both be high; if the two received sets of two bits include three zero bits, signal path 307A will be low and signal paths 307B-307D will be high; if the two received sets of two bits include four zero bits, signal paths 307A-307D will all be high.

Circuit 306B is electrically coupled to a set of "B" inputs of circuit 308 via signal paths 307E-307H. If the two sets of two bits received by circuits 304C and 304D do not include any zero bits, circuit 306B outputs a logic low signal on signal paths 307E-307H. When circuit 306B determines, based on Equation VI and the logic signals received on signal paths 305E-305H, that the two sets of two bits received by circuits 304C and 304D include at least one zero bit, circuit 306B outputs a logic high signal on signal path 307H. When circuit 306B determines, based on Equation V and the logic signals received on signal paths 305E-305H, that the two sets of two bits received by circuits 304C and 304D include at least two zero bits (which also indicates that the two sets of two bits include at least one zero bit), circuit 306B outputs a logic high signal on signal paths 307G and 307H. When circuit 306B determines, based on Equation IV and the logic signals received on signal paths 305E-305H, that the two sets of two bits received by circuits 304C and 304D include at least three zero bits (which also indicates that the two sets of two bits include at least one zero bit, and at least two zero bits), circuit 306B outputs a logic high signal on signal paths 307F, 307G, and 307H. When circuit 306B determines, based on Equation III and the logic signals received on signal paths 305E-305H, that the two sets of two bits received by circuits 304C and 304D include at least four zero bits (which also indicates that the two sets of two bits include at least one zero bit, and at least two zero bits, and at least three zero bits), circuit 306B outputs a logic high signal on signal paths 307E, 307F, 307G, and 307H.

Thus, in one embodiment, if the two sets of two bits received by circuit 304C and 304D include no zero bits, signal paths 307E-307H will all be low; if the two received sets of two bits include one zero bit, signal paths 307E-307G will be low and signal path 307H will be high; if the two received sets of two bits include two zero bits, signal paths 307E and 307F will both be low and signal paths 307G and 307H will both be high; if the two received sets of two bits include three zero bits, signal path 307E will be low and signal paths 307F-307H will be high; if the two received sets of two bits include four zero bits, signal paths 307E-307H will all be high.

Circuit 308 performs the third step in the three step hierarchical DBI decoding. In one embodiment, circuit 308 determines, based on the logic signals received from circuits 306A and 306B via signal paths 307A-307H, whether the received data word includes at least five zero data bits. If the data word includes at least five zero data bits, circuit 308 outputs a DBI flag with a logic high state via output 309 to indicate to DBI unit 214 that the data word is to be inverted. If the data word does not include at least five zero data bits, circuit 308 outputs a DBI flag with a logic low state via output 309 to indicate that the data word is not to be inverted. In another embodiment, circuit 308 sets the DBI flag linked to the data word to a logic high state to indicate the data word is not to be inverted and to a logic low state to indicate the data word is to be inverted.

In one embodiment, circuit 308 generates DBI flags based on the signals received on inputs A and B according to the following Equation VII:

$$dbiFlag=\{(at\_least\_four\_0)_A \text{ and } (at\_least\_one\_0)_B\}$$
$$\text{or } \{(at\_least\_one\_0)_A \text{ and } (at\_least\_four\_0)_B\}$$
$$\text{or } \{(at\_least\_three\_0)_A \text{ and } (at\_least\_two\_0)_B\}$$
$$\text{or } \{(at\_least\_two\_0)_A \text{ and } (at\_least\_three\_0)_B\} \quad \text{Equation VII}$$

Figure 4:
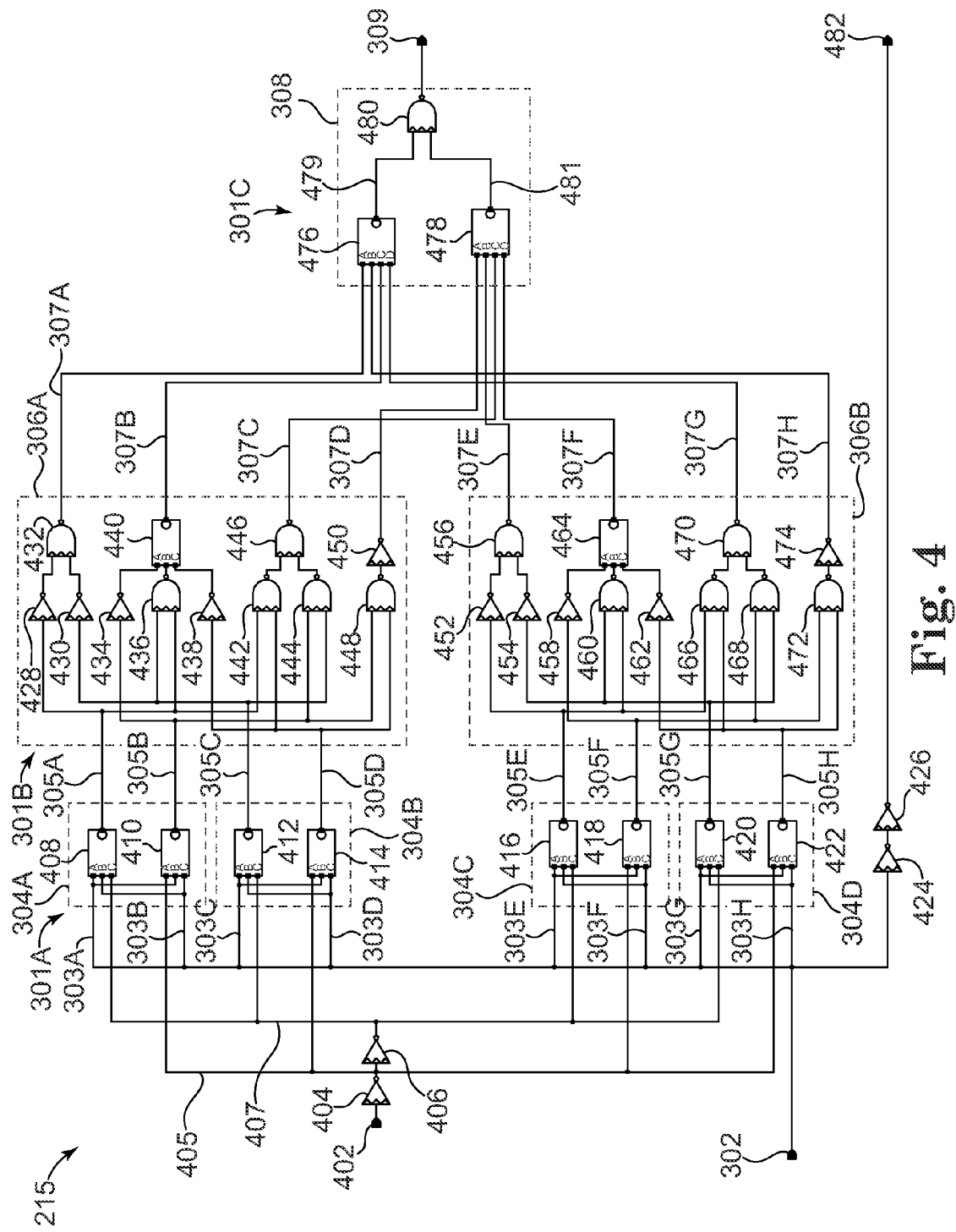
FIG. 4 is a schematic diagram illustrating the digital DBI flag generator circuit shown in FIG. 3 in additional detail according to one embodiment.

FIG. 4 is a schematic diagram illustrating the digital DBI flag generator circuit 215 in additional detail according to one embodiment. DBI flag generator circuit 215 includes an input 302, binary digital logic circuits 304A-304D, 306A-306B, and 308, output 309, and inverters 404, 406, 424, and 426. Circuit 304A includes 3-input NAND circuit 408 and 3-input NOR circuit 410. Circuit 304B includes 3-input NAND circuit 412 and 3-input NOR circuit 414. Circuit 304C includes 3-input NAND circuit 416 and 3-input NOR circuit 418. Circuit 304D includes 3-input NAND circuit 420 and 3-input NOR circuit 422. The three inputs of each of the circuits 408-422 are identified by the letters "A", "B", and "C".

DBI flag generator circuit 215 receives an enable signal via signal path 402. The enable signal is inverted by inverter 404, which outputs the inverted signal on signal path 405. Signal path 405 is coupled to an "A" input of each of the NOR circuits 410, 414, 418, and 422. The signal output by inverter 404 is also inverted by inverter 406, which outputs the enable signal on signal path 407. Signal path 407 is coupled to a "C" input of each of the NAND circuits 408, 412, 416, and 420.

In one embodiment, circuit 215 receives 8-bit data words (in<7:0>) from memory array 216 through input 302. For each received 8-bit data word, a first set of two bits of the word are provided to circuit 304A via respective signal paths 303A and 303B; a second set of two bits of the word are provided to circuit 304B via respective signal paths 303C and 303D; a third set of two bits of the word are provided to circuit 304C via respective signal paths 303E and 303F; and a fourth set of two bits of the word are provided to circuit 304D via respective signal paths 303G and 303H. Received data words are also output from circuit 215 through inverters 424 and 426 and signal path 482.

In the illustrated embodiment, bit number seven of a received data word is provided to the "A" input of NAND circuit 408 and to the "B" input of NOR circuit 410 via signal path 303A. Bit number six of the word is provided to the "B" input of the NAND circuit 408 and to the "C" input of the NOR circuit 410 via signal path 303B. Bit number five of the word is provided to the "A" input of the NAND circuit 412 and to the "B" input of the NOR circuit 414 via signal path 303C. Bit number four of the word is provided to the "B" input of the NAND circuit 412 and to the "C" input of the NOR circuit 414 via signal path 303D. Bit number three of the word is provided to the "A" input of NAND circuit 416 and to the "B" input of NOR circuit 418 via signal path 303E. Bit number two of the word is provided to the "B" input of the NAND circuit 416 and to the "C" input of the NOR circuit 418 via signal path 303F. Bit number one of the word is provided to the "A" input of the NAND circuit 420 and to the "B" input of the NOR circuit 422 via signal path 303G. Bit number zero of the word is provided to the "B" input of the NAND circuit 420 and to the "C" input of the NOR circuit 422 via signal path 303H.

Circuits 304A-304D perform logical NAND and NOR operations on the set of two bits that each circuit receives, and output logical signals to circuits 306A and 306B on signal paths 305A-305H indicative of the number of logical zero bits in the received set of eight bits. The logical signals output by circuits 304A-304D based on the number of zero bits in the received bits were described above with respect to FIG. 3.

Circuit 306A includes inverters 428, 430, 434, 438, and 450, 2-input NAND circuits 432, 436, 442, 444, 446, and 448, and 3-input NAND circuit 440. Circuit 306B includes inverters 452, 454, 458, 462, and 474, 2-input NAND circuits 456, 460, 466, 468, 470, and 472, and 3-input NAND circuit 464. Signal path 305A is coupled to inverter 428, a second input of NAND circuit 436, and a first input of NAND circuit 442. Signal path 305B is coupled to inverter 434, a first input of NAND circuit 444, and a first input of NAND circuit 448. Signal path 305C is coupled to inverter 430, a first input of NAND circuit 436, and a second input of NAND circuit 444. Signal path 305D is coupled to inverter 438, a second input of NAND circuit 442, and a second input of NAND circuit 448. Signal path 305E is coupled to inverter 452, a second input of NAND circuit 460, and a first input of NAND circuit 466. Signal path 305F is coupled to inverter 458, a first input of NAND circuit 468, and a first input of NAND circuit 472. Signal path 305G is coupled to inverter 454, a first input of NAND circuit 460, and a second input of NAND circuit 468. Signal path 305H is coupled to inverter 462, a second input of NAND circuit 466, and a second input of NAND circuit 472.

A first input of NAND circuit 432 is coupled to the output of inverter 428. A second input of NAND circuit 432 is coupled to the output of inverter 430. The output of NAND circuit 432 is coupled to signal path 307A. The "A" input of 3-input NAND circuit 440 is coupled to the output of inverter 434. The "B" input of NAND circuit 440 is coupled to the output of NAND circuit 436. The "C" input of NAND circuit 440 is coupled to the output of inverter 438. The output of a NAND circuit 440 is coupled to signal path 307B. A first input of NAND circuit 446 is coupled to the output of NAND circuit 442. A second input of NAND circuit 446 is coupled to the output of NAND circuit 444. The output of NAND circuit 446 is coupled to signal path 307C. The input of inverter 450 is coupled to the output of NAND circuit 448. The output of inverter 450 is coupled to signal path 307D.

A first input of NAND circuit 456 is coupled to the output of inverter 452. A second input of NAND circuit 456 is coupled to the output of inverter 454. The output of NAND circuit 456 is coupled to signal path 307E. The "A" input of 3-input NAND circuit 464 is coupled to the output of inverter 458. The "B" input of NAND circuit 464 is coupled to the output of NAND circuit 460. The "C" input of NAND circuit 464 is coupled to the output of inverter 462. The output of NAND circuit 464 is coupled to signal path 307F. A first input of NAND circuit 470 is coupled to the output of NAND circuit 466. A second input of NAND circuit 470 is coupled to the output of NAND circuit 468. The output of NAND circuit 470 is coupled to signal path 307G. The input of inverter 474 is coupled to the output of NAND circuit 472. The output of inverter 474 is coupled to signal path 307H.

Circuits 306A and 306B perform logical NAND and inversion operations on the logic signals received from circuits 304A-304D, and output logical signals to circuit 308 on signal paths 307A-307H indicative of the number of zeros in a received data word. The logical signals output by circuits 306A and 306B based on the signals received from circuits 304A-304D were described above with respect to FIG. 3.

Circuit 308 includes AND-OR-Invert (AOI) circuits 476 and 478, and 2-input NAND circuit 480. AOI circuits 476 and 478 each include four inputs, which are identified by the letters "A", "B", "C", and "D". The "A" input of AOI circuit 476 is coupled to signal path 307A. The "B" input of AOI circuit 476 is coupled to signal path 307H. The "C" input of AOI circuit 476 is coupled to signal path 307B. The "D" input of AOI circuit 476 is coupled to signal path 307G. The "A" input of AOI circuit 478 is coupled to signal path 307D. The "B" input of AOI circuit 478 is coupled to signal path 307E. The "C" input of AOI circuit 478 is coupled to signal path 307C. The "D" input of AOI circuit 478 is coupled to signal path 307F. AOI circuits 476 and 478 each perform a logical AND operation on the logical signals at the "A" and "B" inputs of the circuit, perform a logical AND operation on the logical signals at the "C" and "D" inputs of the circuit, and perform a logical OR operation on the results of the two logical AND operations.

The result of the logical operations performed by AOI circuit 476 is output to a first input of NAND circuit 480 via signal path 479. The result of the logical operations performed by AOI circuit 478 is output to a second input of NAND circuit 480 via signal path 481. NAND circuit 480 performs a logical NAND operation on the signals received through signal paths 479 and 481, and outputs a DBI flag via output 309 based on the received signals. In one embodiment, if the 8-bit data word received by circuit 215 includes at least five zero data bits, circuit 308 outputs a DBI flag with a logic high state via output 309 to indicate that the data word is to be inverted. If the data word does not include at least five zero data bits, circuit 308 outputs a DBI flag with a logic low state via output 309 to indicate that the data word is not to be inverted. In another embodiment, circuit 308 sets the DBI flag linked to the data word to a logic high state to indicate the data word is not to be inverted and to a logic low state to indicate the data word is to be inverted.

One digital approach for implementing a DBI decoder (also referred to as a digital DBI flag generator) is to use a conventional adder. If the sum of eight one bit numbers stays below three, than at least five zeros are present in the byte, and a DBI flag is generated. However, such adder-based designs are relatively large and slow. A DBI decoder may also be implemented using an analog approach, and comparing the sum of currents flowing through two branches of a circuit. However, such analog solutions can suffer from incorrect evaluations (in particular at smaller device geometries) due to random Vth-mismatch between devices. Hence, the analog solutions have difficulty in distinguishing between closely adjacent combinations (e.g., five zeros and three ones; or four zeros and four ones). It is also difficult to integrate such analog solutions into a semi-custom design.

One embodiment provides a digital DBI decoder (or digital DBI flag generator) that is smaller and faster than other digital adder-based solutions, and does not suffer from the incorrect evaluation problems or integration problems of analog solutions. In one embodiment, DBI decoding is broken down into a three step hierarchical approach using the fact that eight is equal to two to the power of three. The approach can easily be extended to any coding scheme where the number of bits is equal to a power of two.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated circuit comprising:
    an array of memory cells; and
    a digital flag generator circuit configured to generate a data inversion flag based on whether a number of logical zero bits contained in a data word to be transmitted from the memory cells is greater than a threshold number, wherein the digital flag generator circuit includes a first digital stage including a first plurality of binary logic circuits configured to receive the data word directly from the array of memory cells, wherein each of the binary logic circuits is configured to receive a different subset of the data word directly from the array of memory cells, wherein each of the binary logic circuits includes at least one of a 3-input NAND circuit and a 3-input NOR circuit, wherein the at least one of a 3-input NAND circuit and a 3-input NOR circuit in each of the binary logic circuits is configured to receive two bits of the data word, perform a binary logic operation on the two bits, and generate two binary output signals, and wherein the binary output signals for each binary logic circuit are indicative of a number of logical zero bits contained in the two bits received by the binary logic circuit.

2. The integrated circuit of claim 1, wherein a first one of the binary output signals for each binary logic circuit indicates whether the two bits received by the binary logic circuit includes at least one logical zero bit.

3. The integrated circuit of claim 2, wherein a second one of the binary output signals for each binary logic circuit indicates whether the two bits received by the binary logic circuit includes at least two zero bits.

4. The integrated circuit of claim 1, wherein the digital flag generator circuit includes a second digital stage including a second plurality of binary logic circuits, and wherein each binary logic circuit in the second plurality is configured to operate on outputs of binary logic circuits in the first plurality.

5. The integrated circuit of claim 4, wherein each binary logic circuit in the second plurality is configured to generate four binary output signals that are indicative of a number of logical zero bits contained in four bits of the data word.

6. The integrated circuit of claim 4, wherein the digital flag generator circuit includes a third digital stage including a binary logic circuit configured to operate on the binary output signals of the binary logic circuits in the second plurality.

7. The integrated circuit of claim 6, wherein the binary logic circuit of the third digital stage is configured to generate the data inversion flag based on the binary output signals of the second plurality of binary logic circuits.

8. The integrated circuit of claim 1, and further comprising:
a data inversion circuit configured to invert the data word based on the data inversion flag.

9. The integrated circuit of claim 1, wherein each binary logic circuit in the first plurality includes a 3-input NAND circuit and a 3-input NOR circuit.

10. The integrated circuit of claim 1, wherein the integrated circuit is a DRAM.

11. A system comprising:
a host; and
a memory device communicatively coupled to the host, the memory device comprising:
an array of memory cells; and
a digital flag generator circuit configured to generate a data inversion flag based on whether a number of logical zero bits contained in a data word is greater than a number of logical one bits contained in the data word, wherein the digital flag generator circuit includes a first digital stage including a first plurality of binary logic circuits, and wherein each of the binary logic circuits includes at least one of a 3-input NAND circuit and a 3-input NOR circuit with two inputs for receiving only two bits of the data word directly from the array of memory cells and two outputs for outputting two binary output signals indicative of a number of logical zero bits in the received two bits, and wherein each of the binary logic circuits is configured to perform a binary logic operation on the two bits received by the binary logic circuit.

12. The system of claim 11, wherein a first one of the binary output signals for each binary logic circuit indicates whether the two bits received by the binary logic circuit includes at least one logical zero bit.

13. The system of claim 12, wherein a second one of the binary output signals for each binary logic circuit indicates whether the two bits received by the binary logic circuit includes at least two logical zero bits.

14. The system of claim 11, wherein the digital flag generator circuit includes a second digital stage including a second plurality of binary logic circuits, and wherein each binary logic circuit in the second plurality is configured to receive the binary output signals of two of the binary logic circuits in the first plurality.

15. The system of claim 14, wherein each binary logic circuit in the second plurality is configured to generate four binary output signals that are indicative of a number of logical zero bits contained in four bits of the data word.

16. The system of claim 14, wherein the digital flag generator circuit includes a third digital stage including a binary logic circuit configured to receive the binary output signals of two of the binary logic circuits in the second plurality.

17. The system of claim 16, wherein the binary logic circuit of the third digital stage is configured to generate the data inversion flag based on the binary output signals of the second plurality of binary logic circuits.

18. A method for operating a memory, the method comprising:
providing a digital flag generator circuit in the memory including a first digital stage having a first plurality of binary logic circuits coupled directly to an array of memory cells, wherein each of the binary logic circuits includes at least one of a 3-input NAND circuit and a 3-input NOR circuit;
receiving with the at least one of a 3-input NAND circuit and a 3-input NOR circuit in each binary logic circuit a different set of two bits of a data word to be transmitted from the memory;
outputting two logical signals from the at least one of a 3-input NAND circuit and a 3-input NOR circuit in each binary logic circuit based on the received bits of the data word, the two logical signals from each binary logic circuit indicative of a number of logical zero bits contained in the two bits received by the binary logic circuit;
processing the logical signals output from the binary logic circuits with at least one additional digital stage to determine whether a number of logical zero bits contained in the data word is greater than a threshold number; and
generating a data inversion flag based on the determination of whether the number of logical zero bits contained in the data word is greater than the threshold number.

* * * * *